United States Patent [19]
Schmidt

[11] Patent Number: 5,024,633
[45] Date of Patent: Jun. 18, 1991

[54] HYDROMECHANICAL TRANSMISSION WITH ADJUNCT FLYWHEEL

[75] Inventor: Michael R. Schmidt, Carmel, Ind.

[73] Assignee: General Motors Corporation, Detroit, Mich.

[21] Appl. No.: 549,839

[22] Filed: Jul. 9, 1990

[51] Int. Cl.⁵ .............................................. F16H 47/04
[52] U.S. Cl. ........................................ 475/72; 475/80; 74/880
[58] Field of Search ....................... 475/72, 73, 78, 80, 475/302, 303, 323, 324, 327, 328

[56] References Cited

U.S. PATENT DOCUMENTS

| | | | |
|---|---|---|---|
| 4,126,200 | 11/1978 | Miller et al. | 74/880 X |
| 4,353,269 | 10/1982 | Hiersig | 475/72 X |
| 4,563,914 | 1/1986 | Miller | 475/80 |
| 4,843,907 | 7/1989 | Hagin et al. | 475/80 |

FOREIGN PATENT DOCUMENTS 0159445 10/1985 European Pat. Off. .............. 475/72
55-094054 7/1980 Japan ..................................... 475/72

Primary Examiner—Allan D. Herrmann
Assistant Examiner—William Trousdell
Attorney, Agent, or Firm—Donald F. Scherer

[57] ABSTRACT

A power transmission has a gear portion, a hydrostatic portion and a flywheel which can be selectively interconnected for transmitting power from an engine to an output shaft. The flywheel can be accelerated by the engine to a predetermined speed to store energy which is used in cooperation with the engine to provide driving power for acceleration of the vehicle. The power transmission has three ranges of operation with the engine in selective combination with the flywheel, gearing and hydrostatic portion. A fourth range is available through the gearing only.

2 Claims, 1 Drawing Sheet

HYDROMECHANICAL TRANSMISSION WITH ADJUNCT FLYWHEEL

BACKGROUND OF THE INVENTION

This invention relates to power transmissions, and more particularly, to hydromechanical transmissions having an energy storage device.

SUMMARY OF THE INVENTION

It is an object of this invention to provide an improved power transmission, wherein an engine is selectively coupled to an output driven member through a gear arrangement and a hydrostatic transmission arrangement, and further wherein, an energy storage device is selectively coupled with the engine gearing arrangement and hydrostatic transmission arrangement to selectively store energy from the system, and deliver energy to the system.

It is another object of this invention to provide an improved power transmission for delivering power from an engine to an output mechanism wherein friction devices, gearing arrangements and a hydrostatic transmission arrangement are selectively coupled to the engine to provide two phases of operation, and also wherein, the friction devices and the gearing arrangements are selectively coupled to the engine to provide two other phases of operation, and further wherein, a flywheel is provided to store energy for return to the power transmission during at least two of the phases of operation.

These and other objects of the invention will be more readily apparent from the following specification and drawings.

DESCRIPTION OF THE DRAWINGS

The drawing is a schematic representation of a power train incorporating the present invention.

DESCRIPTION OF THE EMBODIMENT

Figure 1:
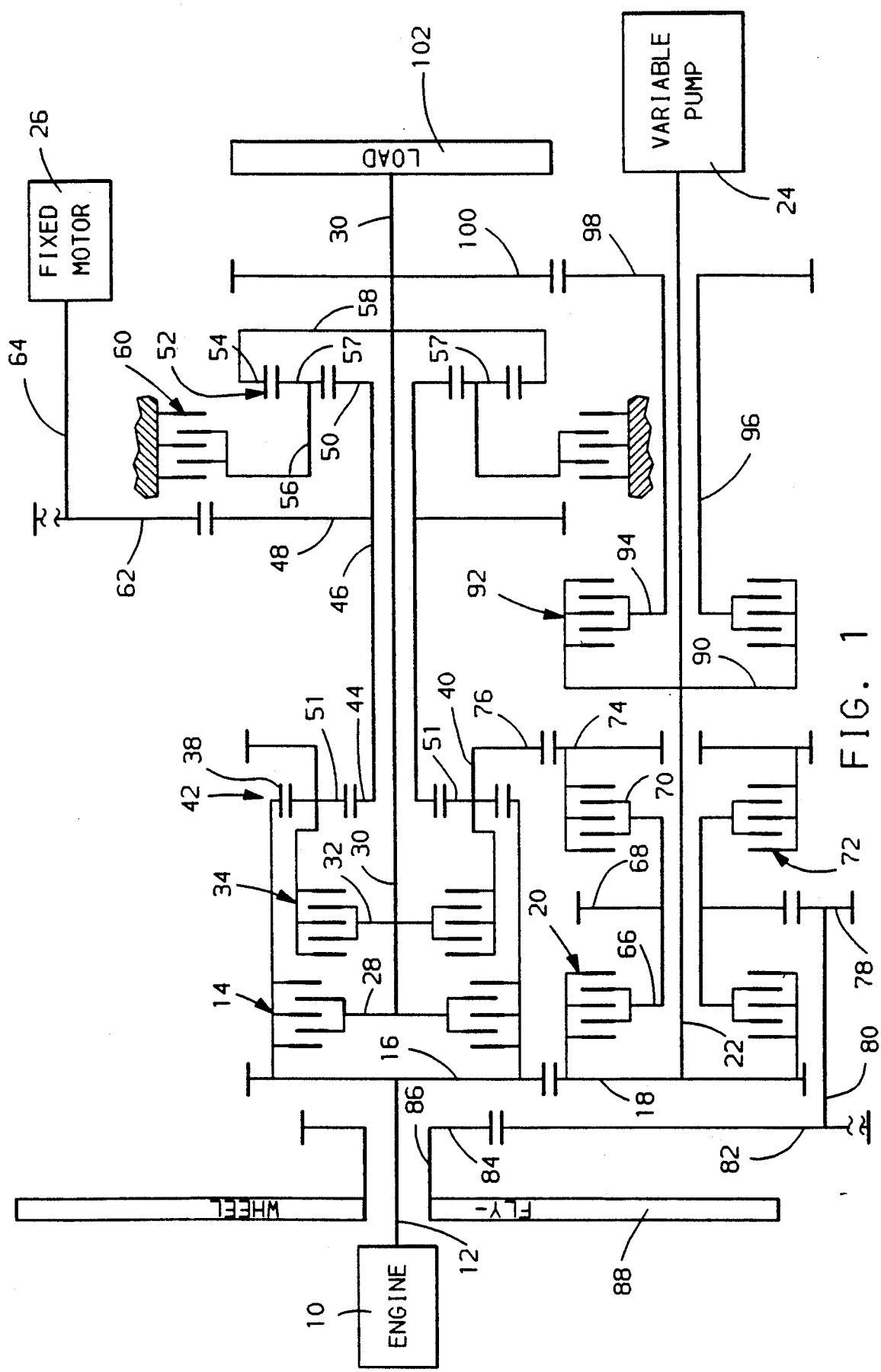

The power train shown in the drawing includes an engine 10 having an output shaft 12 which is drivingly connected to a clutch 14. The shaft 12 has secured thereto a gear member 16 which is in meshing relation with a gear member 18. The gear member 18 is drivingly connected to a clutch 20 and a pump drive shaft 22. The pump drive shaft 22 is drivingly connected to a variable displacement pump 24 which is hydraulically coupled with a fixed displacement motor 26.

The clutch 14 has an output portion 28 which is drivingly connected to an output shaft 30, which in turn, is connected with a portion 32 of a clutch 34 and to shaft 30. The clutches 14 and 34 are connected to a ring gear 38 and a planet carrier assembly 40, respectively, of a planetary gear set 42. The planetary gear set 42 further includes a sun gear 44 which is drivingly connected to a sleeve shaft 46, which in turn, has coupled therewith a gear member 48 and a sun gear 50. The carrier assembly 40 has a plurality of pinion gears 51 rotatably mounted thereon and disposed in meshing relation with the sun gear 44 and the ring gear 38.

The sun gear 50 is a component in a planetary gear arrangement 52 which also includes a ring gear 54 and a planet carrier assembly 56, which has pinion gears 57 rotatably mounted thereon and disposed in meshing relation with the sun gear 50 and the ring gear 54. The ring gear 54 is drivingly connected through a hub 58 with the output shaft 30, and the planet carrier assembly 56 is operably connected with a brake assembly 60. The gear 48 is disposed in meshing relation with a gear 62 which is drivingly connected to a drive shaft 64 of the fixed displacement motor 26.

The clutch 20 has a portion 66 which is drivingly connected with a gear member 68 and a portion or hub 70 of a clutch 72. The clutch 72 is drivingly connected with a gear 74 which is disposed in meshing relation with a gear 76 which is drivingly connected with the carrier assembly 40 of the planetary gear set 42. The gear 68 is in meshing relationship with a gear 78, which in turn, is drivingly connected through a shaft 80 with a flywheel input gear 82. The gear 82 meshes with a gear 84 which is drivingly connected through a sleeve shaft 86 to a flywheel 88.

The pump drive shaft 22 is drivingly connected to a hub 90 which forms a housing portion for a clutch 92. The clutch 92 has an inner hub portion 94 which is drivingly connected through a sleeve shaft 96 to a gear 98. The gear 98 meshes with a gear 100 which is drivingly connected with the output shaft 30. The output shaft 30 is operatively connected to a load 102, such as vehicle drive wheels.

The clutch 20 is selectively engageable to provide a drive connection between the gear 18 and the flywheel 88. The clutch 14 is selectively engageable to provide a drive connection between the engine shaft 12 and the output shaft 30. The clutch 34 is selectively engageable to establish a drive connection between the carrier assembly 40 and the output shaft 30. The clutch 72 is selectively engageable to provide a drive connection between the flywheel 88 and the carrier assembly 40. The clutch 92 is selectively engageable to provide a drive connection between the shaft 22 and the output shaft 30. The brake 60 is selectively engageable to establish the planet carrier assembly 56 as a ground or stationary member in the planetary gear set arrangement 52.

The above enumerated drive connections are established through various gear connections which are readily apparent when viewing the drawing. The friction devices represented by the clutches and brake are preferably conventional fluid operated devices which are selectively engageable to control the drive paths through the power train. The clutch 72 is also selectively engageable to permit the flywheel to be accelerated to a predetermined operating speed by the engine 10.

For the following description, the various gear members throughout the drive train will be presumed to have the following number of teeth:

| Gear | Teeth | Gear | Teeth |
| --- | --- | --- | --- |
| 16 | 55 | 48 | 52 |
| 18 | 35 | 62 | 38 |
| 84 | 27 | 38 | 100 |
| 82 | 67 | 44 | 56 |
| 78 | 23 | 50 | 27 |
| 68 | 57 | 54 | 97 |
| 74 | 35 | 100 | 33 |
| 76 | 55 | 98 | 28 |

The pump 24 is a conventional hydraulic device in which the displacement can be adjusted both sides of center (zero displacement) to provide what is commonly termed plus and minus displacements. To accelerate the flywheel, the following procedure can be utilized. The pump 24 has the displacement thereof established at minus (−) eight cubic inches per revolution. The clutch 72 is slowly engaged or energized while the engine is at low idle speed, approximately 600 rpm. This clutch engagement is through a conventional modulating system which will prevent the engine from stalling. When the clutch 72 is fully engaged, the flywheel 88 will be rotating at approximately 1500 rpm, while the motor (26) speed is at approximately a minus (−) or negative 950 rpm. These values are for use with a vehicle weighing 40,000 pounds.

The engine is then accelerated to its desired operating speed of approximately 2100 rpm. This will cause the flywheel to be accelerated to approximately 5000 rpm and the motor 26 will be at a speed of approximately −3300 rpm. Once this condition is reached, the displacement of pump 24 is reduced from a −8 cubic inches per revolution to a −3.6 cubic inches per revolution, thus increasing the speed of the flywheel to 10,000 rpm while the motor 26 decreases to a speed of approximately −1480 rpm. At this point, the clutch 72 is disengaged, the engine speed is reduced to approximately 950 rpm and the clutch 20 is synchronously engaged. At this point, the engine and flywheel are rotating in unison through the interconnected gear arrangement. The transmission is now in a condition to supply power to the output shaft. It should be appreciated that the engine rpm and motor rpm are combined in planetary gear set 42 in a manner such that as the negative motor rpm is decreased (when pump displacement decreases) the speed of carrier assembly 40 will increase.

During the first range of operation with the flywheel contributing energy to the system, the clutch 20 and brake 60 are engaged so that both the engine energy and the flywheel energy are delivered through the pump 24 to the motor 26 and then through the planetary arrangement 52 to the output shaft 30. During this phase or range of operation, the motor 26 rotates opposite to the engine 10. However, the planetary gear arrangement 52 reverses this rotation thereby accomplishing forward rotation of the output shaft 30.

At a vehicle speed of approximately seven miles per hour of the vehicle, the brake 60 is disengaged and the clutch 34 is synchronously engaged. This causes a change in the power flow through the system, such that a portion of the engine power and the flywheel power are directed via the planetary gear set 42 to the output 30 and a portion of the power to the motor 26 acting as a rotating reaction. The motor 26 supplies driving energy to the pump 24. The pump 24 provides regenerated energy through the gear mesh 18 and 16.

As the vehicle accelerates above 13 miles per hour, the pump again becomes a motivating force for the hydrostatic portion of the transmission, such that the motor 26 is driven by the pressurized fluid to contribute power to drive the vehicle through the planetary gear set 42.

The third range is engaged at approximately 19 miles per hour with the clutches 34 and 20 being disengaged, while the clutches 14 and 72 are engaged. This is a synchronous shift point since there is no speed differential between the clutch plates of the oncoming clutches. In theory, all four clutches can be simultaneously engaged at this particular speed point, as is well known with synchronous shift hydromechanical transmissions.

Between the engagement of the third range and approximately 25 miles per hour, the flywheel energy is directed to the carrier assembly 40 while the engine energy is delivered to the clutch 14, which in turn is connected with the output shaft 30. The flywheel energy is directed partially to the fixed displacement motor 26 through the planetary gear set 42, and partially to the clutch 14. The displacement of the pump 24 continues to decrease through this phase of the third range, while the engine speed is increased and the motor 26 provides a rotating reaction at the sun gear 44.

During the second phase (above 25 mph) of the third range of operation, the power transmitted by the hydrostatic portion, including the pump 24 and motor 26, is reversed such that a portion of the engine power is utilized to drive the pump 24, which in turn, drives the motor 26. The hydrostatic power contribution and the flywheel power contribution are added through the planetary gear set 42 and delivered to the clutch 14 and output shaft 30.

When the vehicle reaches the speed of approximately 35 miles per hour, the flywheel can no longer contribute to vehicle propulsion and the hydrostatic transmission elements are effectively removed from the power transmission system by preventing the power generation of pressure through the use of a control regulator valve, not shown.

During this third phase of range three, the engine power is directed to the output shaft 30 through the clutch 14 and the remainder of the transmission, namely, the flywheel and hydrostatic portion are inoperable for transmitting power.

At approximately 45 miles per hour of the vehicle, the clutch 14 is disengaged and the clutch 92 is engaged. This is not a synchronous shift. At the fourth range, the engine power is delivered through the gear mesh 16, 18 through the clutch 92 and then through the gear mesh 98, 100 to the output shaft 30. It should be apparent that the third phase of range three and range four are purely mechanical drive systems with the engine power being delivered directly to the output shaft 30.

There are also four ranges of operation similar to the above described ranges, wherein the flywheel 88 is not required in the system to establish power flow. Therefore, the power train disclosed herein can provide complete system operation with and without flywheel contribution.

During the first range of engine only driving, the brake 60 is engaged and the power flow is from the engine 10 through the hydrostatic pump 24 to the motor 26 and then through the planetary gear arrangement 52 to the output shaft.

During the first phase (approximately 12 to 28 mph) of range two of engine only driving, the clutch 34 is engaged while the brake 60 is disengaged, and the power flow is split by the planetary gear set 42 such that a portion is directed to the motor 26 and a portion is directed to the shaft 30. The power directed to the motor 26 is delivered to the pump 24 through the hydraulic fluid which recirculates the power through the gear mesh 18, 16 to the planetary gear set 42. Hence, the motor 26 is a rotating reaction member through the sun gear 44. The speed changes during the first range and the first phase of the second range are controlled through change and displacement of the pump 24, while the engine is maintained at the governed or maximum speed 2100 rpm.

At approximately 28 miles per hour, the pump 24 and motor 26 interchange functions whereby the pump becomes the driving force and the motor becomes the driven force. This is a synchronous speed interchange.

The engine power is split by the gear mesh 16–18 between the planetary gear set 42 and the pump input shaft 22. However, the power delivered by the motor 26 is combined with the engine power through the planetary gear set 42 such that during this phase of operation, there is no power regenerated within the system.

The third (approximately 38 to 42 mph) and fourth (approximately 42 to 60 mph) ranges of the engine drive only, are similar to the third phase of range three and range four which were previously described. Thus, in range three, only the clutch 14 is engaged and all of the engine power is directed to the output shaft 30. The shifts from second range to third range and third range to fourth range are not synchronous shifts.

It should be noted that at the start of the third range, which is approximately 38 miles per hour, the engine speed is reduced from 2100 rpm to approximately 1800 rpm. During the third range vehicle speed changes are accomplished by changing the speed of the engine. To establish the fourth range, the clutch 14 is disengaged, while the clutch 92 is engaged. During this clutch interchange, the engine speed is reduced from approximately 2100 rpm to approximately 1700 rpm. To adjust the vehicle speed during fourth range, the engine speed is controlled between 1700 rpm and 2100 rpm.

From the above description, it should now be apparent to those skilled in the art that the present invention provides a hybrid hydromechanical power transmission which will operate with and without an energy storage device, such as a flywheel.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydromechanical transmission comprising: engine input means; flywheel input means; hydrostatic transmission means having a pump means and motor means; first planetary gear means having a first member drivingly connected with said engine input means, a second member connected with said motor means and a third member; second planetary gear means having a first member connected with said output means, a second member connected with said motor means and a third member; brake means for selectively restraining said third member of said second planetary gear means; means drivingly connecting said engine input means with said pump means; first clutch means for selectively connecting said engine input means with said output means; second clutch means for selectively connecting said engine input means with said flywheel input means; third clutch means for selectively connecting said engine input means to said output means through a speed increasing gear arrangement; fourth clutch means for selectively connecting said flywheel with said third member of said first planetary gear means; and fifth clutch means for selectively connecting said third member of said first planetary gear means with said output means.

2. A hydromechanical transmission with an energy storage flywheel comprising: engine input means; flywheel input means; hydrostatic transmission means having a pump means and motor means; first planetary gear means having a ring gear member drivingly connected with said engine input means, a sun gear member connected with said motor means and a carrier assembly; second planetary gear means having a ring gear member connected with said output means, a sun gear member connected with said motor means and a carrier assembly; brake means for selectively restraining said carrier assembly of said second planetary gear means; means drivingly connecting said engine input means with said pump means; first clutch means for selectively connecting said engine input means with said output means; second clutch means for selectively connecting said engine input means with said flywheel input means; third clutch means for selectively connecting said engine input means to said output means through a speed increasing gear arrangement; fourth clutch means for selectively connecting said flywheel with said carrier assembly of said first planetary gear means; fifth clutch means for selectively connecting said carrier assembly of said first planetary gear means with said output means, said clutch means and said brake means being selectively operable to provide two operating ranges of operation combining energy stored in said flywheel and energy from an engine with the hydrostatic transmission means; and two operating ranges using only the engine energy, said first clutch means and said third clutch means.

* * * * *